…

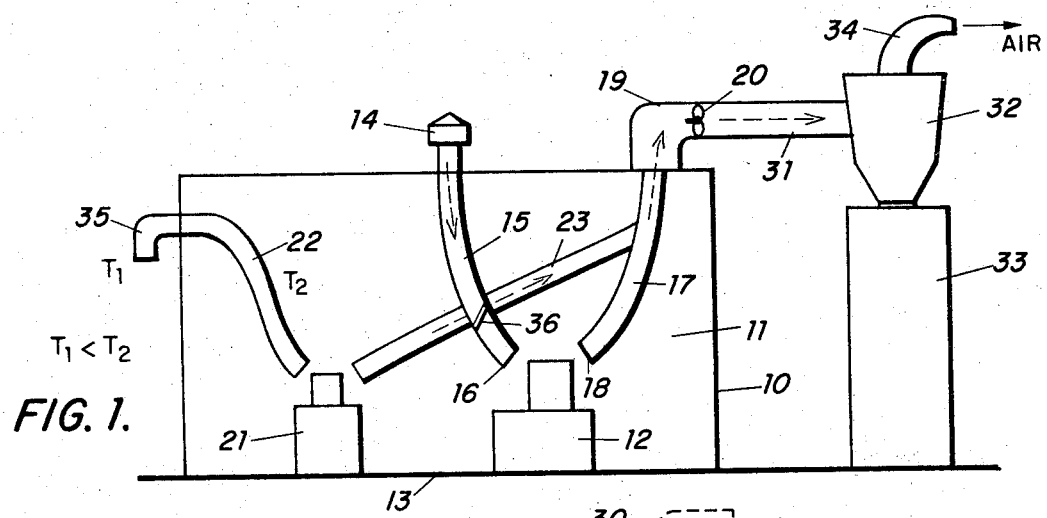
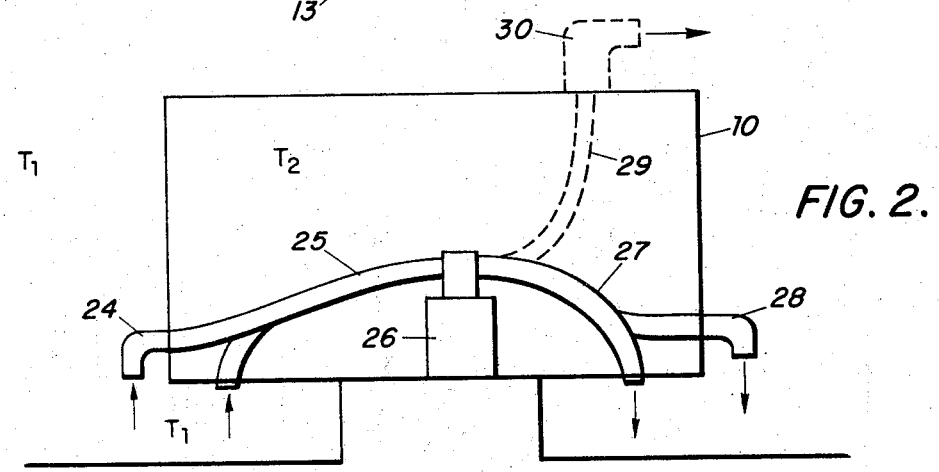
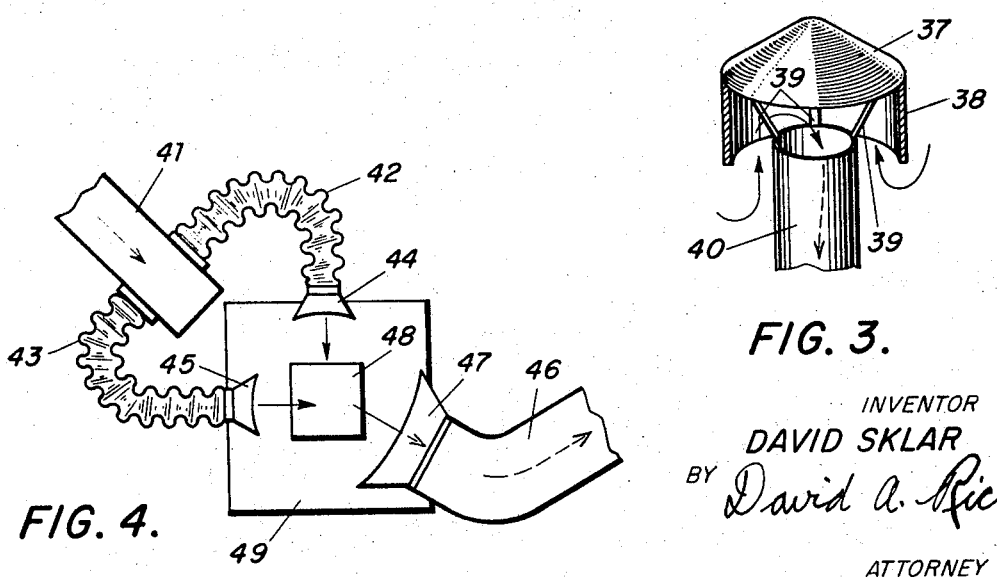

United States Patent Office 3,368,474
Patented Feb. 13, 1968

3,368,474
AIR VENTING SYSTEM
David Sklar, Nashua, N.H. (% Nashua Wood Products Inc., Merrimack, N.H. 03054)
Continuation of application Ser. No. 396,173, Sept. 14, 1964. This application Nov. 9, 1966, Ser. No. 593,224
2 Claims. (Cl. 98—115)

ABSTRACT OF THE DISCLOSURE

Apparatus for removing undesirable fumes and foreign matter from a work area in an enclosure with little disturbance of the surrounding atmosphere. Inlet conduits and outlet conduits communicating with the air exteriorly of the enclosure are positioned with their openings adjacent waste generating areas in a manner to direct lateral flow of air across the waste generating areas. Air propelling means are housed in the outlet conduits to pull air from the exterior through the inlet conduits across the waste generating areas, and to exhaust the air laden with fumes and foreign matter to the exterior through the outlet conduits.

---

The present invention relates to the problem of exhausting waste products, for example, in a manufacturing area. More particularly, the invention relates to an air venting system and method for conducting air through and exhausting an area subject to the development of undesirable fumes, dust, chips, etc.

In a manufacturing plant it is frequently necessary to remove from an enclosed volume of air various waste products resulting from manufacturing operations. A typical installation in the prior art employs an exhaust fan to force air through an outlet in an enclosed volume. This procedure results in the development of negative pressures within the enclosure. During the winter months severe heat losses are developed because of the more or less constant flow of air from without the enclosure through the enclosure. The result of the development of negative pressure within the enclosure relative to the pressure outside contributes to the difficulty for example, of opening an outside door. Plant personnel have a tendency to leave the door open rather than constantly be faced with the problem of forcing it to open.

In the wintertime, a blast of cold air enters and immediately reduces the temperature in the vicinity of the door. This results in exposing personnel to severe drafts and sharp temperature changes to present a personnel health hazard.

To overcome the draft problem in the prior art, air traps are introduced to provide an intermediate insulating pressure reduction chamber having two entrances. In contrast, the present invention eliminates the need for such a chamber.

Reduced pressure within the enclosure tends to fatigue personnel. In the prior art preheated air requiring special apparatus is introduced to offset the negative temperature. In contrast, the present invention obsoletes such a requirement.

In the summer months or in warm climates severe losses of air-conditioned cool air greatly increases the cost of operation.

In a typical prior art air venting system, for example, for use in a woodworking plant, a substantial amount of waste materials are produced in the form of sawdust or chips in the various cutting, sawing and sanding operations. A conduit having an opening in the vicinity of the waste producing area is coupled for example, to an exhaust fan which forces the waste through the conduit and exhausts it out of the enclosure. In the wintertime such a system draws upon the ambient heated air and exhausts the heated air at a very substantial rate. The entire volume of enclosed air may be recirculated as much as 20 times per hour or more. Given an exhaust system capable of exhausting 26,000 cubic feet of air per minute, a volume of the order of 250,000 cubic feet can be recirculated completely in 6 minutes. This gives rise to an enormous and continuing heat loss. Conversely, in the summertime when the plant is air-conditioned, a substantial amount of cooled air is lost in such a process.

As distinct from the instant invention, prior art systems frequently introduce special apparatus to recover exhausted processed air by use of elaborate filter systems. In contrast, with the air venting system of the present invention, the exhaust function may be accomplished with air recirculation for a given volume as little as once an hour.

It is therefore an object of the present invention to provide an improved air venting system for substantially reducing losses of processed air.

Another object of the invention is to provide an improved air venting system which automatically maintains a pressure balance between the atmosphere and an enclosed volume of air.

Yet another object of the invention is to provide an improved air venting system which enables the use of a heating system of reduced size, complexity and cost for a given enclosed volume.

A further object of the invention is to provide an improved air venting system for more efficiently exhausting waste products.

In accordance with the invention, there is provided an air venting system. This system includes a first ambient source of air at a first temperature and an enclosure means enclosing a volume of air at a second temperature differing from the first temperature. The enclosure means is surrounded by air from the first source at the first temperature. An inlet conduit means is coupled to an inlet formed in the enclosure means communicating with the first source for conducting air at the first temperature from the first source to a selected local evacuation region. The air of the first and second temperatures mix in the region. Outlet conduit means are coupled to an outlet formed in the enclosure means for conducting air from the evacuation region through the outlet. In this manner, air from the first source is conducted through the region from the inlet to the outlet substantially without changing the second temperature of the enclosed volume of air.

Other and further objects of the invention will be apparent from the following description, taken in connection with the accompanying drawing, and its scope will be pointed out in the appended claims.

In the drawing:
FIG. 1 is a schematic diagram of an air venting system embodying the invention;
FIG. 2 is a schematic diagram of a modification of the embodiment in FIG. 1;
FIG. 3 is a front view partially in section of an inlet duct member useful in the invention; and
FIG. 4 is a plan view of a modification of the invention showing a plurality of flexible conduits in the vicinity of a waste producing machine.

Referring now to the drawing and with particular reference to FIG. 1 there is here illustrated a manufacturing plant 10 enclosing a volume of air at a temperature $T_2$. The plant 10 is surrounded by the atmosphere, the outside ambient temperature being less than the temperature of the air within the plant 10, i.e. $T_1 < T_2$. A machine 12 such as a saw which produces sawdust in the course of its operation is positioned on the floor 13 of the plant 10. Atmospheric air at temperature $T_1$ is admitted through an inlet duct 14 in the roof of the plant 10. The incoming air from the atmosphere may be, e.g., cold relative to the enclosed air and is conducted through an inlet conduit 15 through opening 16 in the vicinity of the machine 12. An output conduit 17 has an opening 18 in the vicinity of the machine 12 and couples the air to an outlet duct 19 formed in the roof of the plant 10. An exhaust fan 20 is mounted in the duct 19 for exhausting air in the direction indicated by the arrow.

A machine 21 is shown in another location, for example, a drill or another saw, having an inlet branch conduit 22 and an outlet branch conduit 23. The branch inlet conduit 22 is coupled, as shown, to a second inlet duct 35. The conduit 22 may be coupled directly to the main inlet conduit 15. The branch outlet conduit 23 is coupled directly to the main outlet conduit 17 to provide a parallel flow path for exhausting the machine 21. The inlet conduits for a plurality of machines may be coupled directly to a plurality of corresponding inlet ducts or may be parallel connected directly from a common inlet duct such as the duct 14. In like manner, the outlet or exhaust conduit may be coupled to a plurality of outlet ducts. Broadly the total cross-section of outlet should equal the total inlet cross-section.

The duct 19 is coupled to a conduit 31 which communicates with a cyclone funnel chamber 32. The cyclone funnel 32 has an exhaust duct 34 and extends from a waste depository 33. An automatic damper control 36 of conventional design is disposed in the inlet conduit 15 to control the rate of flow. The damper may be manually pre-set for a desired flow condition and then varies automatically with the differential pressure.

In operation cold air at temperature $T_1$, for example, 0° F., enters the inlet duct 14 and travels down the inlet conduit 15 in the direction indicated by the arrow to the opening 16 of the conduit 15 which is located in the vicinity of the waste-producing region of the machine 12. The exhaust fan 20 creates a negative pressure region between the openings 16 and 18 of the inlet and outlet conduits 16 and 17 respectively. Thus, the flow of air through the conduit 15 and out the conduit 17 is substantially forced by the operation of the exhaust fan 20, bounded by the conduits 15 and 17 and the opening in the vicinity of the machine. Only a relatively small amount of the ambient enclosed air is drawn into the outlet from the region where the air at the two temperatures tends to mix.

In the event that the temperature difference is quite great, for example, 70°, it is undesirable to expose the operator's hands to the incoming cold air. Thus, the conduit openings 16 and 18 are so disposed as to minimize this exposure. Furthermore, the existence of a negative pressure region between the openings 16 and 18 produces a flow of warm air by the operator into the outlet conduit 17.

The waste carrying air flows through the conduit 31 into the cyclone chamber 32. There the funnel shaped chamber causes the air to flow in a vortex and recirculate within the chamber. The heavier waste material falls down through the opening at the bottom of the chamber 32 and is deposited in the chamber 33.

The motion of the air from the inlet conduit to the outlet conduit provides a controlled laminar flow of air which forces waste material ejected by the machine along a desired path, e.g., away from the operator. In contrast, prior art systems provide only an exhaust conduit which is ineffective, for example, for chips ejected in a direction away from the exhaust opening.

Referring now to FIG. 2, there is here illustrated a modification of the system in FIG. 1. It will be seen here that the inlet and outlet ducts may be disposed at various locations in the enclosure walls. Thus, an inlet duct 24 is coupled to an inlet conduit 25 to an exhaust area of a machine 26. An outlet conduit 27 is coupled to an outlet duct 28. The ducts 24 and 28 are located relatively close to the ground. This modification may be more suitable for certain applications. Here again an exhaust fan may be disposed in the outlet duct 28. In such a circumstance, the circulating air through the duct 24, conduit 25, conduit 27 and outlet duct 28 is warmer than the enclosed ambient air.

In a further modification of the system in FIG. 1, shown in dashed lines, a duct 30 may be formed in the roof of the plant and coupled through a conduit 29 to the machine 26. It may be more convenient to locate an inlet duct low relative to the ground and exhaust upwardly through the roof. Similarly, it may be more convenient to locate the outlet duct low and the inlet duct relatively high.

Referring now to FIG. 3 there is here illustrated an inlet duct useful in the present invention. A conical cover has a cylindrical extension wall. The cover is supported by struts 39 attached to the cover and an inlet pipe 40. Air flows under the wall 38 into the pipe 40. This structure avoids undue influence on air flow due to winds shifting in direction.

Referring now to FIG. 4 there is here illustrated a modification of the system particularly showing the venting structures at the waste generating region 48 of a machine 49. Thus, an inlet conduit 41 has a pair of flexible inlet hoses 42 and 43 connected in parallel. The hoses have funnelled extensions 44 and 45 to provide controlled air flow into a selected region. An outlet conduit 46 has a funnelled extension 47 to receive waste bearing air flow from the waste generating region. For incoming cold air, the level of the outlet may be below that of one or more of the inlets. The disposition of the flexible hoses may be adjusted to optimize waste removal. Of course the outlet conduit may be flexible as well to enable optimum positioning.

Because of the overhead structure, the embodiment of FIG. 1 appears to be generally more applicable.

In an embodiment of the invention based on FIG. 1 which was actually constructed and tested, the enclosed volume of air is 240,000 cubic feet, the exhaust fan circulates 26,000 cubic feet per minute, two exhaust conduits each have a cross-section of 6 square feet. The system has 30 inlet branches with a total cross-section of 12 square feet. Replacement of air is heated at the rate of 5,000 cubic feet per minute in contrast with 26,000 cubic feet per minute required with a prior art system.

With a prior art system a furnace capacity of 1,000,000 B.t.u. is required. In the present system only 200,000 B.t.u. capacity is required. Thus the original installation cost is reduced 80% or more and the operating cost by 80% or more.

It will be apparent from the foregoing description of the invention that the invention has broad application to air circulation systems where relatively warm or cold air losses may be minimized.

While there has hereinbefore been described what is at present considered to be preferred embodiments of the invention, it will be apparent to those of ordinary skill in the art that many and various changes and modifications may be made with respect to the embodiments described and illustrated without departing from the spirit of the invention. It will be understood, therefore, that all such changes and modifications as fall fairly within the scope of the present invention, as defined in the appended claims, are to be considered as a part of the present invention.

What is claimed is:

1. In a manufacturing building enclosing a volume of processed air, a waste disposal air-venting system for exhausting waste products in the vicinity of processing apparatus without unduly exhausting processed air, comprising:

inlet conduit means coupled to an inlet duct formed in the roof of said building for conducting unprocessed air from the atmosphere to a selected waste generating region, said unprocessed air and said processed air mixing in said region, said inlet conduit means including an element so shaped and positioned adjacent one side of said waste generating region as to provide lateral air flow through said selected waste generating region;

outlet conduit means having substantially the same total cross-sectional area as said inlet conduit means coupled to an outlet duct formed in the roof of said building for conducting air from said region through said outlet duct, the opening of said outlet conduit being positioned on the other side of said waste generating region and substantially opposite said inlet conduit means;

impeller means coupled to said outlet duct for producing a negative pressure in said selected waste generating region to pull air from said inlet conduit means through said region and said outlet conduit means, to remove waste material from said region substantially without removing the ambient processed air thereby preventing any substantial change in the temperature within said building; and valving means coupled to said inlet conduit means for adjusting the velocity of air flow through said region.

2. The system in claim 1, wherein:
said conduit means included a funnelled extension in said region for shaping said air flow further to control the motion of waste material.

References Cited

UNITED STATES PATENTS

| | | | |
|---|---|---|---|
| 2,209,054 | 7/1940 | Doud et al. | 98—1 |
| 2,256,515 | 9/1941 | Brueshaber | 98—115 X |
| 2,565,933 | 8/1951 | Schneible | 98—115 |
| 2,579,401 | 12/1951 | Schneible et al. | 98—115 |
| 2,874,627 | 2/1959 | Simmonds | 98—115 |
| 2,939,614 | 6/1960 | Hill | 98—115 X |

ROBERT A. O'LEARY, *Primary Examiner.*

M. A. ANTONAKAS, *Assistant Examiner.*